(12) United States Patent
Larach

(10) Patent No.: US 8,123,436 B2
(45) Date of Patent: Feb. 28, 2012

(54) UNDERGROUND INFILTRATION TANK MODULE

(76) Inventor: Oscar Larach, Sydney (AU)

( * ) Notice: Subject to any disclaimer, the term of this patent is extended or adjusted under 35 U.S.C. 154(b) by 385 days.

(21) Appl. No.: 12/545,749

(22) Filed: Aug. 21, 2009

(65) Prior Publication Data

US 2011/0044760 A1 Feb. 24, 2011

(51) Int. Cl.
*E02B 11/00* (2006.01)

(52) U.S. Cl. ............... 405/36; 405/43; 405/45; 405/55; 210/170.08

(58) Field of Classification Search ............ 405/52, 405/55, 53, 36, 43, 45; 210/170.08; 220/567.1, 220/565, 507, 553, 555, 675, 673; 404/36, 404/21, 19, 20; 52/660, 663
See application file for complete search history.

(56) References Cited

U.S. PATENT DOCUMENTS

| | | | |
|---|---|---|---|
| 2007/0217866 A1* | 9/2007 | Oscar | 405/36 |
| 2007/0231071 A1* | 10/2007 | Brochu et al. | 405/43 |

FOREIGN PATENT DOCUMENTS

| | | | |
|---|---|---|---|
| JP | 2005002620 | * | 1/2005 |
| WO | WO2007104083 | * | 9/2007 |

* cited by examiner

*Primary Examiner* — John Kreck
*Assistant Examiner* — Sean Andrish
(74) *Attorney, Agent, or Firm* — Trojan Law Offices

(57) ABSTRACT

An underground infiltration tank module comprising a four-sided periphery formed of a top periphery wall, a bottom periphery wall, and two side periphery walls, a plurality of channels running from the top periphery wall to the bottom periphery wall, holes formed in the channels, strut members running between the channels, and stud members located on the periphery walls. Any two of the plurality of channels are separate from each other such that any part of one channel is not in contact with any part of another channel. The channels alternately face in opposite directions.

20 Claims, 4 Drawing Sheets

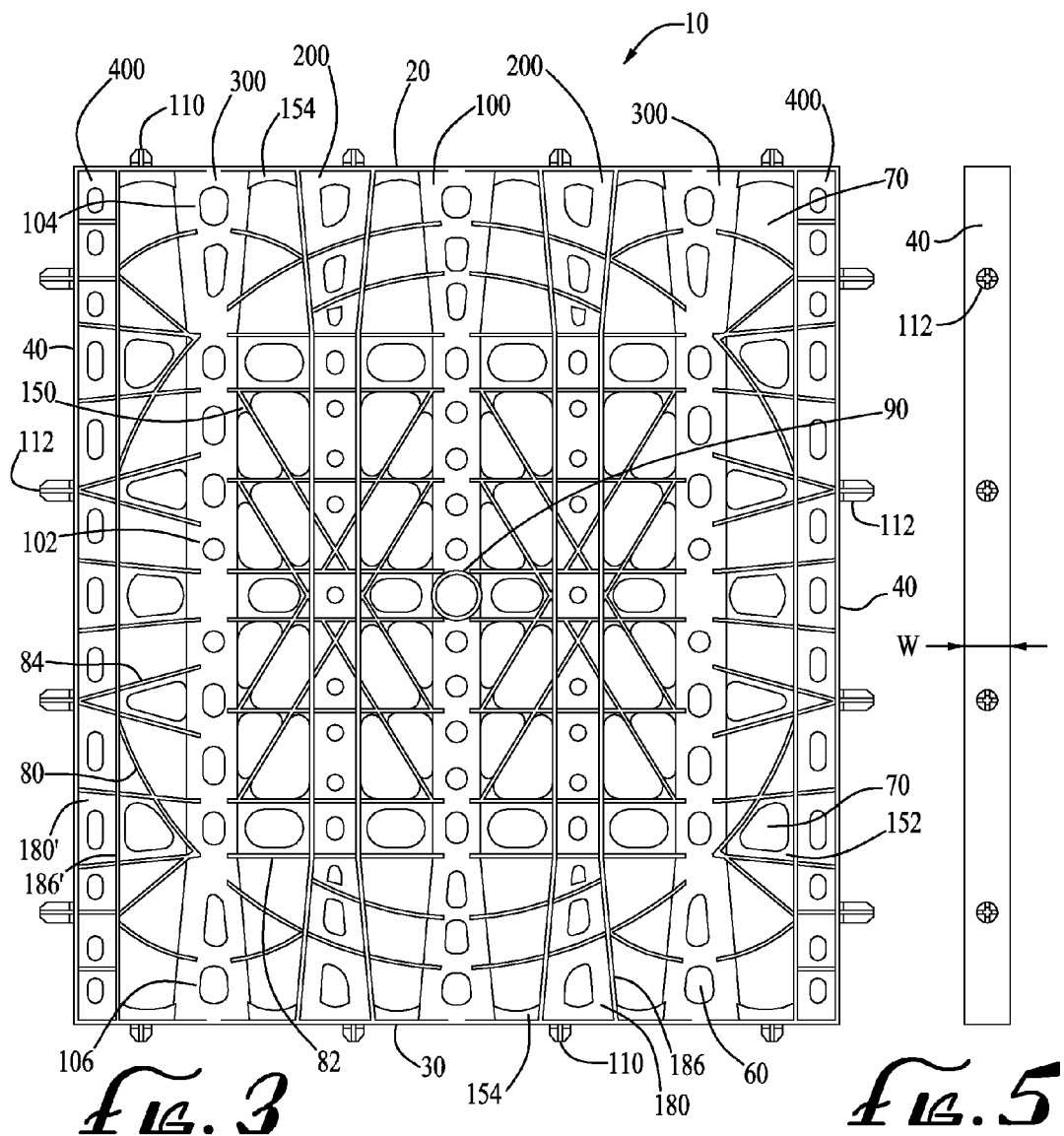
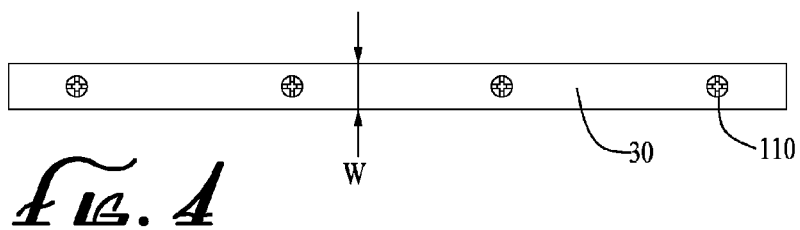

UNDERGROUND INFILTRATION TANK MODULE

FIELD OF THE INVENTION

The present invention relates to modules for underground tanks, and in particular to modules that form underground tanks that collect and store rainwater and/or stormwater.

BACKGROUND OF THE INVENTION

Underground tanks are used to collect and store rainwater for later use such as for watering gardens, flushing toilets, washing machines and cars, agriculture, and for drinking, thereby conserving water and providing many economic and environmental benefits.

Underground tanks can be formed from plastic perforated tank modules, which are butted or stacked together to form the required tank size, wrapped in geotextile and surrounded in good draining medium such as sand. The geotextile material allows water to pass therethrough but prevents any sand from passing. Thus, water flows into the tank via a connecting pipe and percolates into the surrounding strata through the geotextile-covered perforated modules of the tank. Similarly, water percolating through the soil above the tank enters the tank through the geotextile-covered top perforated module of the tank.

Some existing underground tank modules use a large amount of plastic material and contain a small void volume such that water flow through the modules is restricted. Others provide a large void volume for better flow of water through the modules, but have a considerably weak structure.

Accordingly, a need exists for an improved module for underground tanks which would provide adequate void space and water flow through as well as a strong geotextile-supporting skeleton.

SUMMARY OF THE INVENTION

The objective of the invention herein is to provide an improved module for underground infiltration tanks of increased void capacity, adequate water flow through, and increased strength with use of less plastics.

In an embodiment of the present invention, an underground infiltration tank module comprises: a four-sided periphery formed of a top periphery wall, a bottom periphery wall, and two side periphery walls; a plurality of channels running from the top periphery wall to the bottom periphery wall, wherein any two channels of the plurality of channels are separate from each other such that any part of one channel is not in contact with any part of another channel, and wherein the channels alternately face in opposite directions; holes formed in the channels; strut members running between the channels, and; stud members located on the periphery walls. The strut members may also intersect the channels. The strut members may be curved, run substantially parallel to the top periphery wall and to the bottom periphery wall, or run substantially diagonally relative to the side periphery walls.

In another embodiment, the underground infiltration tank module may further comprise a reinforcing node formed therein to provide additional strength to the structure of the underground infiltration tank module.

In still another embodiment, the underground infiltration tank module may further comprise one or more supporting web members for providing enhanced structural strength to the underground infiltration tank module.

BRIEF DESCRIPTION OF THE DRAWINGS

The present invention will now be described by way of example with reference to the accompanying drawings in which:

FIG. 3 is a front view of the underground infiltration tank module according to the embodiment shown in FIG. 1.

FIG. 4 is a bottom view of the underground infiltration tank module according to the embodiment shown in FIG. 1. The top view of the underground infiltration tank module according to the embodiment shown in FIG. 1 is a mirror image of the bottom view shown in FIG. 4.

FIG. 5 is a side view of the underground infiltration tank module according to the embodiment shown in FIG. 1. The opposite side of the view shown in FIG. 5 is a mirror image of the side view shown in FIG. 5.

DETAILED DESCRIPTION OF THE INVENTION

Figure 1:
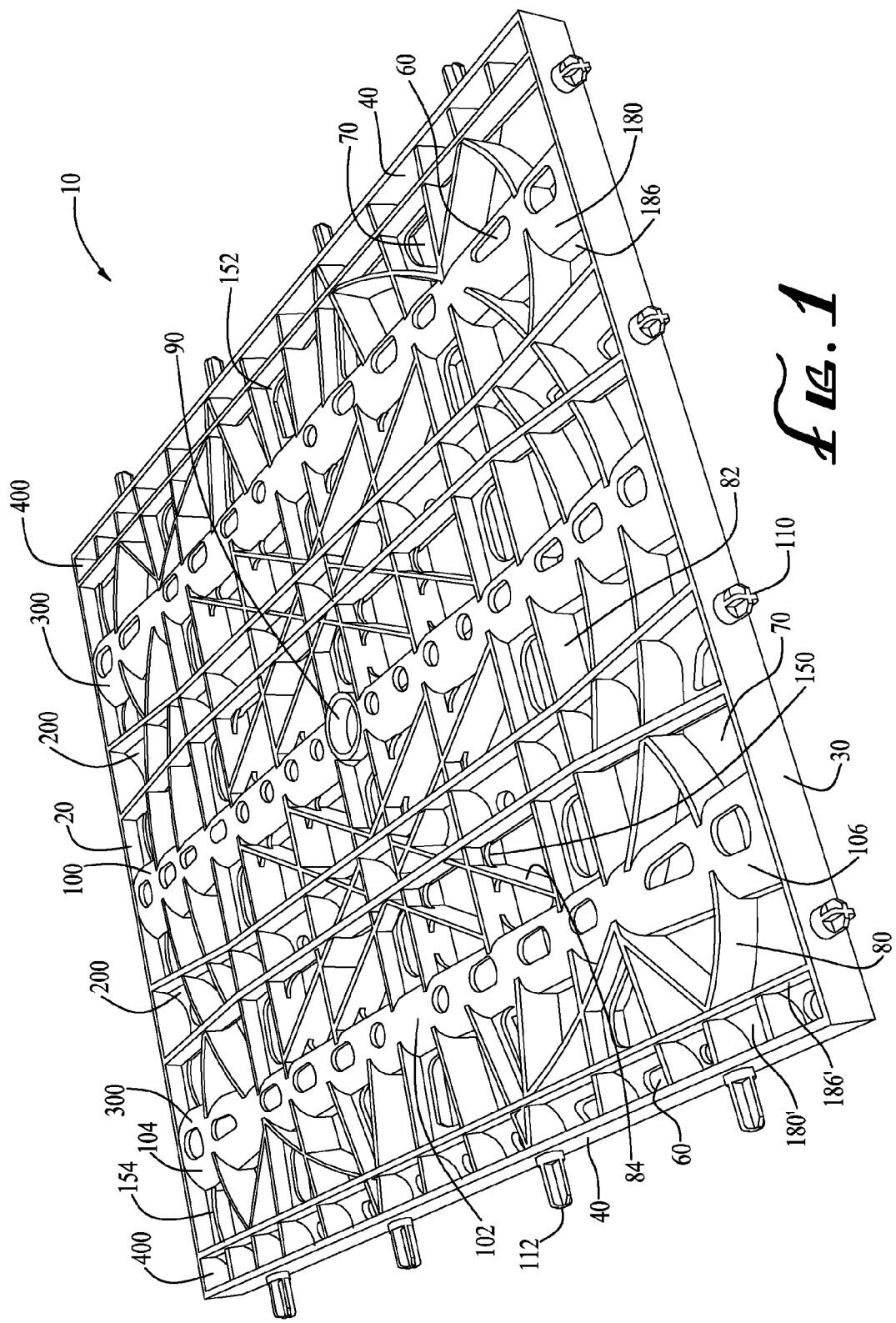
FIG. 1 is a front perspective view of an underground infiltration tank module according to one embodiment of the present invention.
Figure 2:
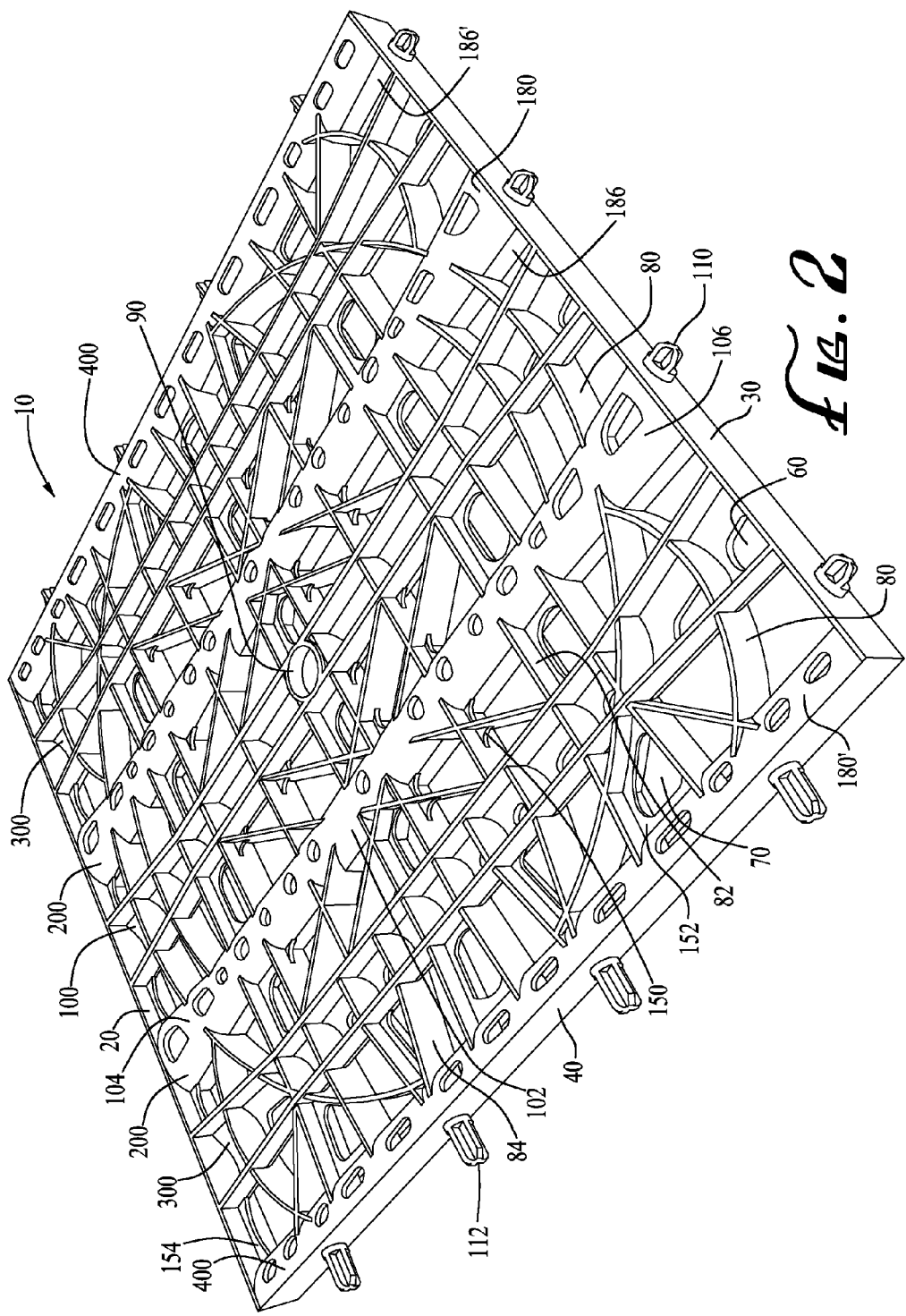
FIG. 2 is a rear perspective view of the underground infiltration tank module according to the embodiment shown in FIG. 1.
Figure 6:
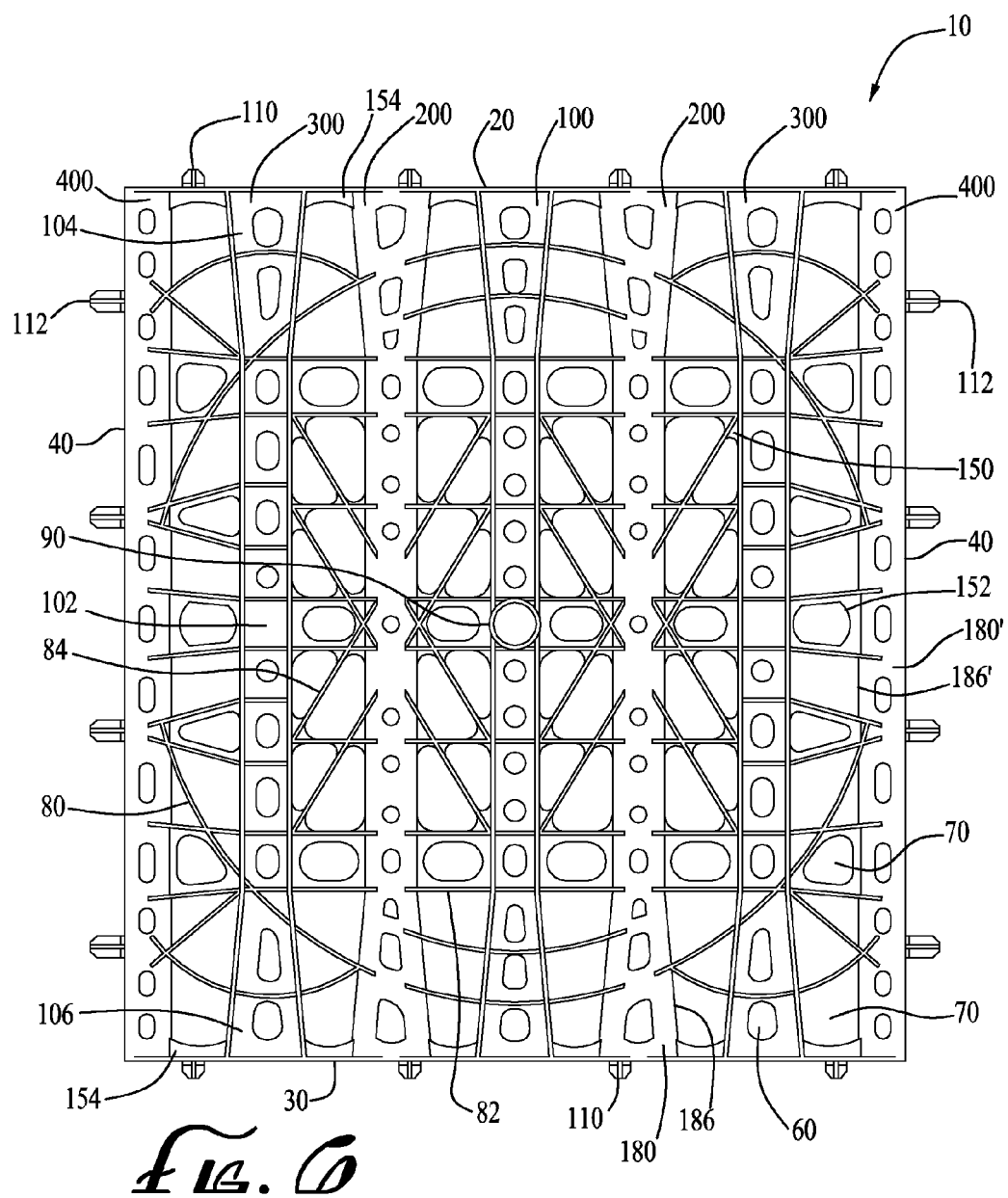
FIG. 6 is a rear view of the underground infiltration tank module according to the embodiment shown in FIG. 1.

FIGS. 1 through 6 illustrate an embodiment of the present invention. The shape of an underground infiltration tank module 10 is defined by a four-sided periphery formed of a top periphery wall 20, a bottom periphery wall 30, and two side periphery walls 40. The top periphery wall 20 and the bottom periphery wall 30 are substantially parallel to each other. Also, the two side periphery walls 40 are substantially parallel to each other. Each of the two side periphery walls 40 connects the top periphery wall 20 and the bottom periphery wall 30 such that the side periphery walls 40 are substantially perpendicular to the top periphery wall 20 and to the bottom periphery wall 30.

The underground infiltration tank module 10 comprises a plurality of channels 100, 200, 300, 400, each of which runs from the top periphery wall 20 to the bottom periphery wall 30. The channels 100, 200, 300, 400 are separate from one another such that any part of one channel is not in contact with any part of another channel. The channels 100, 200, 300, 400 are arranged so as to alternately face in opposite directions. The channels include inner channels 100, 200, 300 and two end channels 400. Each of the end channels 400 integrally adjoins each respective one of the side periphery walls 40 and is formed of a curved body 180' and a flat side 186'. The flat side 186' is substantially parallel to the side periphery wall 40 and extends, along the width W of the side periphery wall 40, preferably only as far as the width of the flat side 186' is less than the width W of the side periphery wall 40. The curved body 180' is integrally formed between the side periphery wall 40 and the flat side 186', connecting the side periphery wall 40 and the flat side 186'. The inner channels 100, 200, 300 are located between the end channels 400 and are substantially evenly spaced between the end channels 400. Each of the inner channels 100, 200, 300 is formed of a curved body 180 and two flat sides 186. The width of each of the flat sides 186 of the inner channels is preferably less than the width W of the side periphery wall 40. The curved body 180 of the inner channels is integrally formed between the two flat sides 186, connecting the two flat sides 186. Each of the inner channels may have a portion that is wider than another portion of the inner channel. For example, as illustrated in FIGS. 1 through 6, each of the inner channels 100, 200, 300 has a mid section 102, a top section 104, and a bottom section 106, wherein each of the top section 104 and the bottom section 106 is wider than the mid section 102. The flat sides 186 in the mid section 102 run substantially parallel to the side periphery walls, whereas the flat sides 186 in the top section 104 and the bottom section 106 are spread out.

The embodiment of FIGS. 1 through 6 shows five inner channels, which are a central channel 100, a pair of first side channels 200, and a pair of second side channels 300. The number of inner channels, however, can vary, and more or less inner channels can be constructed in the underground infiltration tank module of the present invention. Referring to the embodiment shown in FIGS. 1 through 6, the pair of first side channels 200 are located substantially symmetrically with respect to the central channel 100, and the pair of second side channels 300 are located substantially symmetrically with respect to the central channel 100. The first side channels 200 are located between the second side channels 300.

The underground infiltration tank module 10 further comprises strut members 80, 82, 84 that run between the channels and may intersect the channels. Such structure of the underground infiltration tank module 10 that the channels are separate from each other and the strut members run between the channels provides numerous openings 70 in the underground infiltration tank module. The strut members include strut members 80 that are curved, strut members 82 that run substantially parallel to the top periphery wall 20 and to the bottom periphery wall 30, and strut members 84 that run substantially diagonally relative to the side periphery walls 40. The underground infiltration tank module may also include strut members that run substantially parallel to the side periphery walls 40. Since the different types of strut members run in different directions, the strut members meet or intersect each other at various locations in the underground infiltration tank module. Also, the different types of strut members can meet or intersect the channels. For example, as shown in FIGS. 1-3 and 6, a strut member that runs substantially diagonally relative to the side periphery walls 40 can intersect a strut member that runs substantially parallel to the top periphery wall 20 and to the bottom periphery wall 30 at a location between adjacent channels. Also, a strut member that runs substantially diagonally relative to the side periphery walls 40 and a strut member that runs substantially parallel to the top periphery wall 20 and to the bottom periphery wall 30 can meet at a flat side of a channel or at a location within a channel (i.e., between two flat sides 186 of a channel). Two strut members that run substantially diagonally relative to the side periphery walls 40 at different angles or in different directions can intersect each other at a location within a channel or can meet at a flat side of a channel or at a side periphery wall 40. Further, a strut member that is curved can intersect a strut member that runs substantially parallel to the top periphery wall 20 at a location within a channel. Also, a strut member that is curved can intersect a strut member that runs substantially diagonally relative to the side periphery walls 40 at a flat side of a channel. A strut member that is curved can meet another curved strut member at a flat side of a channel. The different types of strut members in FIGS. 1-3 and 6 are arranged to generally provide: three pairs of parallely and horizontally running strut members that intersect all of the inner channels 100, 200, 300, wherein each pair of the strut members are connected with diagonally running strut members that run between each second side channel 300 and its adjacent side periphery wall 40 in a spread-out manner; a strut member generally forming a circle through intersecting all of the inner channels 100, 200, 300 and abutting the end channels 400, and; first pair of diagonally running strut members and second pair of diagonally running strut members that intersect to generally form a "X" shape, wherein a pair of "X" shapes formed by the strut members are located substantially symmetrically with respect to the central channel 100. Different types of strut members can be arranged in various other ways in an underground infiltration tank module.

The underground infiltration tank module may further comprise one or more supporting web members 150, 152, 154. As illustrated in the embodiment of FIGS. 1-3 and 6, supporting web members 150 may be formed at the intersections of two strut members and/or of a strut member and a channel by integrally adjoining them. Also, a supporting web member 152 can integrally adjoin an entire periphery defined by the intersecting strut members and channels. Further, supporting web members 154 may be integrally and inwardly formed from the top periphery wall 20 and from the bottom periphery wall 30. The use of supporting web members 150, 152, 154 provides enhanced structural strength to the underground infiltration tank module 10.

The underground infiltration tank module 10 further comprises holes 60 formed in the channels 100, 200, 300, 400. Referring to FIGS. 1-3 and 6, each of the channels 100, 200, 300, 400 has a plurality of holes 60 of at least two different shapes and sizes. The holes 60 are formed in a curved body 180, 180' of each of the channels 100, 200, 300, 400. The central channel 100, the first side channel 200, the second side channel 300, and the end channel 400 may have different number of holes 60. Various underground infiltration tank modules can be constructed with holes that are different in shape, size, number, and/or arrangement from those shown in FIGS. 1-3 and 6.

The underground infiltration tank module 10 further comprises stud members extending outwardly from the periphery walls. The stud members allow the underground infiltration tank module 10 to be connected with another underground infiltration tank module by engaging complementary apertures thereof, when assembling an underground infiltration tank. Referring to FIGS. 1-3 and 6, the stud members 110 located on the top periphery wall 20 and on the bottom periphery wall 30 are generally shorter than the stud members 112 located on the side periphery walls 40. If desired, stud members of various sizes and shapes can be arranged in various ways in constructing an underground infiltration tank module.

The underground infiltration tank module 10 may further comprise a reinforcing node 90 formed therein to provide additional strength to the structure of the underground infiltration tank module 10. Referring to FIGS. 1-3 and 6, the reinforcing node 90 is formed in the center of the underground infiltration tank module 10, more specifically, in the central channel 100. More reinforcing nodes can be constructed in various locations of an underground infiltration tank module.

While the said detailed description elaborates workable embodiments of the improved structure of an underground infiltration tank module, the said embodiments shall not be construed as a limitation on the patented scope and claims of the present invention and, furthermore, all equivalent adaptations and modifications based on the technological spirit of the present invention shall remain protected within the scope and claims of the invention herein.

What is claimed is:
1. An underground infiltration tank module, comprising:
   a four-sided periphery formed of a top periphery wall, a bottom periphery wall, and two side periphery walls;

a plurality of channels running from the top periphery wall to the bottom periphery wall, any two channels of the plurality of channels separate from each other such that any part of one channel is not in contact with any part of another channel, the channels alternately facing in opposite directions;

holes formed in the channels;

strut members running between the channels; and stud members located on at least two of the periphery walls.

2. The underground infiltration tank module of claim 1, wherein the strut members intersect the channels.

3. The underground infiltration tank module of claim 1, wherein at least one of the strut members is curved.

4. The underground infiltration tank module of claim 1, wherein at least one of the strut members runs substantially parallel to the top periphery wall and to the bottom periphery wall.

5. The underground infiltration tank module of claim 1, wherein at least one of the strut members runs substantially diagonally relative to the side periphery walls.

6. The underground infiltration tank module of claim 1, further comprising: a reinforcing node formed in a center of the underground infiltration tank module.

7. The underground infiltration tank module of claim 1, further comprising: a supporting web member integrally adjoining the strut members.

8. The underground infiltration tank module of claim 1, further comprising: a supporting web member integrally and inwardly formed from the top periphery wall; and a supporting web member integrally and inwardly formed from the bottom periphery wall.

9. The underground infiltration tank module of claim 1, wherein each of the channels has a curved body and at least one flat side.

10. The underground infiltration tank module of claim 1, wherein the plurality of channels include two end channels and at least one inner channel, each of the end channels integrally adjoining each respective one of the side periphery walls, the at least one inner channel located between the end channels.

11. The underground infiltration tank module of claim 10, wherein the inner channel has two flat sides and a curved body integrally formed between the flat sides.

12. The underground infiltration tank module of claim 11, wherein a portion of the inner channel is wider than another portion of the inner channel.

13. The underground infiltration tank module of claim 1, wherein the stud members located on the top periphery wall and on the bottom periphery wall are shorter than the stud members located on the side periphery walls.

14. An underground infiltration tank module, comprising:

a four-sided periphery formed of a top periphery wall, a bottom periphery wall, and two side periphery walls;

a plurality of channels including inner channels and two end channels, the plurality of channels running from the top periphery wall to the bottom periphery wall, any two channels of the plurality of channels separate from each other such that any part of one channel is not in contact with any part of another channel, the channels alternately facing in opposite directions, each of the end channels integrally adjoining each respective one of the side periphery walls, the inner channels located between the end channels, each of the plurality of channels having holes formed therein;

strut members running between the channels, the strut members intersecting the channels; and stud members located on at least two of the periphery walls.

15. The underground infiltration tank module of claim 14, wherein the inner channels are substantially evenly spaced between the end channels.

16. The underground infiltration tank module of claim 15, wherein the inner channels include a central channel, a pair of first side channels, and a pair of second side channels, the pair of first side channels located substantially symmetrically with respect to the central channel, the pair of second side channels located substantially symmetrically with respect to the central channel, the first side channels located between the second side channels, the number of the holes formed in the first side channels different from the number of the holes formed in the second side channels.

17. The underground infiltration tank module of claim 16, further comprising: a reinforcing node formed in the central channel.

18. The underground infiltration tank module of claim 14, wherein the holes formed in each of the channels are of at least two different shapes and sizes.

19. The underground infiltration tank module of claim 14, wherein each of the inner channels has a mid section, a top section, and a bottom section, the top section and the bottom section of each of the inner channels wider than the mid section.

20. The underground infiltration tank module of claim 14, wherein the strut members include strut members that are curved, strut members that run substantially parallel to the top periphery wall and to the bottom periphery wall, and strut members that run substantially diagonally relative to the side periphery walls, such that the strut members intersect each other.

* * * * *